Dec. 8, 1959     B. E. MUSCHALEK, JR     2,916,338
SHAFT BEARING
Filed Nov. 29, 1957
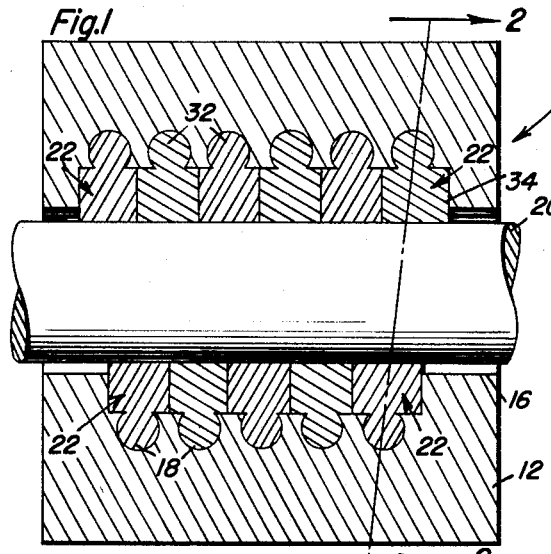
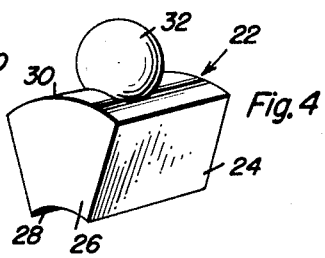
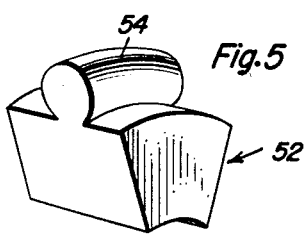
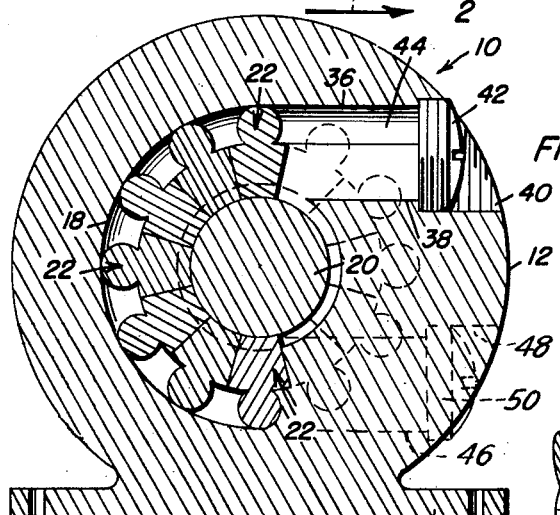
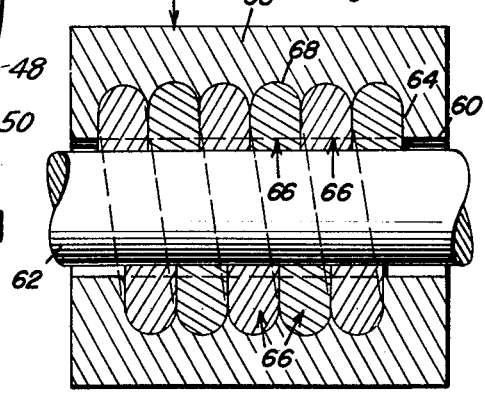
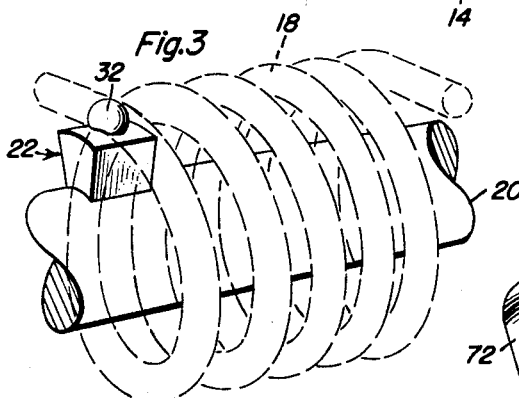
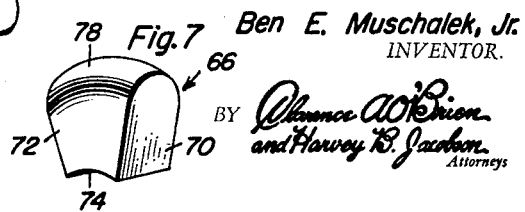
Ben E. Muschalek, Jr.
INVENTOR.

United States Patent Office 2,916,338
Patented Dec. 8, 1959

2,916,338

SHAFT BEARING

Ben E. Muschalek, Jr., McCamey, Tex.

Application November 29, 1957, Serial No. 699,748

8 Claims. (Cl. 308—237)

This invention relates in general to new and useful improvements in bearings, and more specifically to an improved shaft bearing.

There are many instances where shaft bearings of the bushing type are used wherein in the event the bearing should wear to the point it requires replacement, the shut-down time would be extremely costly. Further, there are many instances where although the bearing is bad, conditions will not permit either the shut-down of the machinery or the replacement of the bearing. For example, on the main shafts of a ship should the bearings thereof go bad while at sea, in many instances it would not be possible to shut down the shaft and at the same time replacement of the bearing at sea is impossible.

It is therefore the primary object of this invention to provide a shaft bearing of the bushing type, which shaft bearing is so constructed whereby the bearing elements of the shaft bearing may be readily replaced with a minimum of shut down time and at a minimum of expense.

Another object of this invention is to provide an improved bearing of the bushing type for shafts, the bearing being formed of a plurality of individual segmental bushings which may be individually replaced as is necessary.

A further object of this invention is to provide an improved shaft bearing of the bushing type, the shaft bearing including a bearing housing having formed therethrough a shaft bore and there being provided a bearing race opposing the shaft bore, the bearing race being of a spiral pattern and having engaged therein a plurality of individual bearing members, the bearing members passing into and out of the bearing housing through openings therein whereby new bearing members may be forced into one end of the bearing race and the old bearing members forced out of the other end of the bearing race with the shaft being supported within the bearing at all times and the time required for the installation of the new bearing members being a minimum.

These together with other objects and advantages which will become subsequently apparent reside in the details of construction and operation as more fully hereinafter described and claimed, reference being had to the accompanying drawings wherein like numerals refer to like parts throughout, and in which:

Figure 1 is a longitudinal sectional view taken through the shaft bearing which is the subject of this invention and shows the general details of construction thereof;

Figure 2 is a transverse vertical sectional view taken substantially upon the plane indicated by the section line 2—2 of Figure 1 and shows further the details of construction of the shaft bearing;

Figure 3 is a schematic perspective view showing the shape of the bearing race and the relationship of one bearing member with respect to the bearing race and the shaft with which it engages;

Figure 4 is an enlarged perspective view of one of the bearing members;

Figure 5 is an enlarged perspective view of a modified form of bearing member;

Figure 6 is a longitudinal sectional view similar to Figure 1 on a reduced scale showing a slightly modified form of shaft bearing;

Figure 7 is a perspective view on an enlarged scale showing a third form of shaft bearing member.

Referring now to the drawings in detail, it will be seen that there is illustrated in Figures 1 and 2 a first form of shaft bearing in accordance with this invention, the shaft bearing being referred to in general by the reference numeral 10. The shaft bearing 10 includes a bearing housing 12 which is generally circular in cross-section and which has formed thereon a base 14 to facilitate the mounting thereof. Extending through the bearing housing 12 is a longitudinally extending shaft bore 16.

Opposing the shaft bore 16 and spaced therefrom is a bearing race 18. The bearing race, as is best shown in Figures 1 and 3, is spiral.

Seated in the bearing race 18 and engaging a shaft 20 extending through the bearing 10 and supporting the shaft 20 is a plurality of individual bearing members, the individual bearing members being referred to in general by the reference numeral 22.

As is best shown in Figure 4, the individual bearing member 22 is of a segmental construction and has opposite ends which are rectangular in outline. The sides 26 of the bearing member 22 has the configuration of a segment of a ring. Each bearing member 22 includes a curved inner surface 28 and a curved outer surface 30. The curved inner surface 28 is a shaft engaging bearing surface. Secured to the curved outer surface 30 and projecting upwardly therefrom is a generally spherical extension 32.

As is best illustrated in Figure 1, the bearing race 18 is of a generally circular cross-section. The extensions 32 snugly fit in the bearing race 18 and serve to position the individual bearing members 22. It is to be noted that convolutions of the bearing race 18 are spaced apart longitudinally of the bearing housing 12 a distance whereby the sides 26 of the bearing members 22 of adjacent convolutions are in abutting engagement. Inasmuch as the ends of adjacent bearing members 22 are also in abutting engagement, the plurality of individual bearing members 22 combine to form a bearing surface for the shaft 20 which is continuous both circumferentially and longitudinally.

Referring now to Figure 1 in particular, it will be seen that the bearing members 22 are seated in a recess 34 into which the bearing race 18 opens. The main portions of the bearing members 22 seat in the recess 34.

Referring now to Figure 2 in particular, it will be seen that adjacent to one end of the bearing housing 12 the bearing race 18 includes a tangential portion 36 which opens through the bearing housing 12 to the exterior thereof. The space 36 also includes an extension 38 which opens through the bearing housing 12. The outer parts of the extension 36 and 38 open into an enlarged internally threaded bore 40 which is normally closed by a threaded plug 42. The plug 42 bears against a filler plug 44 which in turn bears against the endmost one of the bearing members 22 to force the bearing members 22 into position.

The opposite end of the bearing housing 12 is provided with a combined extension 46 which is similar to the extensions 36 and 38. The combined extension 46 opens into an internally threaded bore 48 which is closed by a plug 50. Positioned within the extension 46 is a filler plug identical to the filler plug 44. Thus the plugs 42 and 50 combine to position the bearing members 22.

When it is desired to replace the bearing members 22 because of wear on the surfaces 28 thereof, it is merely necessary to remove the plugs 42 and 50 and the filler plugs 44 and to force new bearing members 22 into one of the bores 40 and 48 and permit the new bearings 22 to force the old bearing members 22 out of the other of the bores 40 and 48. When the old bearing members have been forced out of the race 18, then the bearing 10 may be reassembled. From the foregoing, it will be readily apparent that inasmuch as the shaft 20 is supported by bearing members 22 at all times, even during the replacement thereof, that there is no requirement for the supporting of the shaft 20. Further, no machining is required in the bearing replacing operation nor does the operation require very much time.

Referring now to Figure 5 in particular, it will be seen that there is illustrated a slightly modified form of bearing member which is referred to in general by the reference numeral 52. The bearing member 52 differs from the bearing member 22 only in that it is provided with a projection 54 which is circular in cross-section and which is arcuate in elevation as against the general spherical projection 32. It is to be understood that the projection 54 will correspond to the race 18 in which it is to be mounted.

Referring now to Figure 6 in particular, it will be seen that there is illustrated a modified form of bearing for shafts which is referred to in general by the reference numeral 56. The bearing 56 includes a bearing housing 58 having a longitudinal shaft bore 60 therethrough through which a shaft 62 is passed. Opening into the shaft bore 60 is a space 64 in which a plurality of individual bearing members 66 are positioned. Also opening into the space 64 is a spiral bearing race 68. It is to be noted that the spiral bearing race 68 is of a semi-circular cross-section.

Referring now to Figure 7 in particular, it will be seen that there is illustrated one of the bearing members 66. The bearing member 66 is segmental in outline and includes ends 70 which are generally rectangular in outline, but have semicircular upper portions. The bearing member 66 also includes sides 72 which have outlines in the form of segments of a ring. The bearing 66 includes an inner arcuate bearing surface 74 which is a shaft engaging bearing surface and an outer portion 78 which is rounded so as to be complementary to the race 68 in which it is mounted.

It is to be understood that with the exception of the particular configuration of the bearing members 66 and the race 68, the shaft bearing 56 will be identical to the shaft bearing 10.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A shaft bearing comprising a bearing housing, said bearing housing having a longitudinal shaft bore therethrough, a spiral bearing race in said bearing housing opposing said shaft bore, a plurality of shaft engageable bearing members seated in said spiral race, each of said bearing members being arcuate in elevational outline, and means at opposite ends of said spiral bearing race retaining said bearing members in end abutment with one another and forming a circumferentially continuous shaft engageable bearing surface, said bearing members of adjacent convolutions being in side abutting relation whereby said bearing members also form a longitudinally continuous shaft engageable bearing surface.

2. A shaft bearing comprising a bearing housing, said bearing housing having a longitudinal shaft bore therethrough, a spiral bearing race in said bearing housing opposing said shaft bore, a plurality of shaft engageable bearing members seated in said spiral race, each of said bearing members being arcuate in elevational outline, and means at opposite ends of said spiral bearing race retaining said bearing members in end abutment with one another and forming a circumferentially continuous shaft engageable bearing surface, said bearing members of adjacent convolutions being in side abutting relation whereby said bearing members also form a longitudinally continuous shaft engageable bearing surface, convolutions of said spiral bearing race being arcuate in cross-section, said bearing members having corresponding arcuate cross-sectional outer portions.

3. A shaft bearing comprising a bearing housing, said bearing housing having a longitudinal shaft bore therethrough, a spiral bearing race in said bearing housing opposing said shaft bore, a plurality of shaft engageable bearing members seated in said spiral race, each of said bearing members having an inner portion arcuate in elevational outline, and means at opposite ends of said spiral bearing race retaining said bearing members in end abutment with one another and forming a circumferentially continuous shaft engageable bearing surface, said bearing members of adjacent convolutions being in side abutting relation whereby said bearing members also form a longitudinally continuous shaft engageable bearing surface, convolutions of said spiral bearing race being arcuate in cross-section, said bearing members having corresponding arcuate cross-sectional outer portions, said outer portion being substantially spherical.

4. A shaft bearing comprising a bearing housing, said bearing housing having a longitudinal shaft bore therethrough, a spiral bearing race in said bearing housing opposing said shaft bore, a plurality of shaft engageable bearing members seated in said spiral race, each of said bearing members being arcuate in elevational outline, and means at opposite ends of said spiral bearing race retaining said bearing members in end abutment with one another and forming a circumferentially continuous shaft engageable bearing surface, said bearing members of adjacent convolutions being in side abutting relation whereby said bearing members also form a longitudinally continuous shaft engageable bearing surface, convolutions of said spiral bearing race being arcuate in cross-section, said bearing members having corresponding arcuate cross sectional outer portions, said outer portions being circumferentially elongated.

5. A shaft bearing comprising a bearing housing, said bearing housing having a longitudinal shaft bore therethrough, a spiral bearing race in said bearing housing opposing said shaft bore, a plurality of shaft engageable bearing members seated in said spiral race, each of said bearing members having an inner portion arcuate in elevational outline, and means at opposite ends of said spiral bearing race retaining said bearing members in end abutment with one another and forming a circumferentially continuous shaft engaging bearing surface, said bearing members of adjacent convolutions being in side abutting relation whereby said bearing members also form a longitudinally continuous shaft engageable bearing surface.

6. A shaft bearing comprising a bearing housing, said bearing housing having a longitudinal shaft bore therethrough, a spiral bearing race in said bearing housing opposing said shaft bore, a plurality of shaft engageable bearing members seated in said spiral race, each of said bearing members being arcuate in elevational outline, and means at opposite ends of said spiral bearing race retaining said bearing members in end abutment with one another and forming a circumferentially continuous shaft engageable bearing surface, said bearing members of adjacent convolutions being in side abutting relation whereby said bearing members also form a longitudinally continuous shaft engageable bearing surface, convolutions of said spiral bearing race being arcuate in cross-section, said bearing members having corresponding arcuate cross-sectional outer portions, said outer portions being circumferentially elongated, said outer portion being in the form of a narrow rib.

7. A shaft bearing comprising a bearing housing, said bearing housing having a longitudinal shaft bore therethrough, a spiral bearing race in said bearing housing opposing said shaft bore, a plurality of shaft engageable bearing members seated in said spiral race, each of said bearing members being arcuate in elevational outline, and means at opposite ends of said spiral bearing race retaining said bearing members in end abutment with one another and forming a circumferentially continuous shaft engageable bearing surface, said bearing members of adjacent convolutions being in side abutting relation whereby said bearing members also form a longitudinally continuous shaft engageable bearing surface, convolutions of said spiral bearing race being arcuate in cross-section, said bearing members having circumferentially elongated outer portions in the form of narrow ribs, said outer portions each being substantially circular in cross-section.

8. A shaft bearing comprising a bearing housing, said bearing housing having a longitudinal shaft bore therethrough, a spiral bearing race in said bearing housing opposing said shaft bore, a plurality of shaft engageable bearing members seated in said spiral race, each of said bearing members being arcuate in elevational outline, and means at opposite ends of said spiral bearing race retaining said bearing members in end abutment with one another and forming a circumferentially continuous shaft engageable bearing surface, said bearing members of adjacent convolutions being in side abutting relation whereby said bearing members also form a longitudinally continuous shaft engageable bearing surface, convolutions of said spiral bearing race being arcuate in cross-section, said bearing members having corresponding arcuate cross-sectional outer portions, said outer portions being circumferentially elongated, said inner portion and said outer portions of said bearing members being of the same widths.

References Cited in the file of this patent

UNITED STATES PATENTS

| 317,993 | Guss | May 19, 1885 |
| 930,230 | Rhodes | Aug. 3, 1909 |
| 1,746,981 | Anderson | Feb. 11, 1930 |
| 1,795,821 | Baldwin | Mar. 10, 1931 |

FOREIGN PATENTS

| 18,708 | Great Britain | Aug. 30, 1904 |